No. 634,286. Patented Oct. 3, 1899.
J. L. CREVELING.
ELECTRIC LIGHTING SYSTEM FOR CARS.
(Application filed July 15, 1899.)
(No Model.) 2 Sheets—Sheet 1.
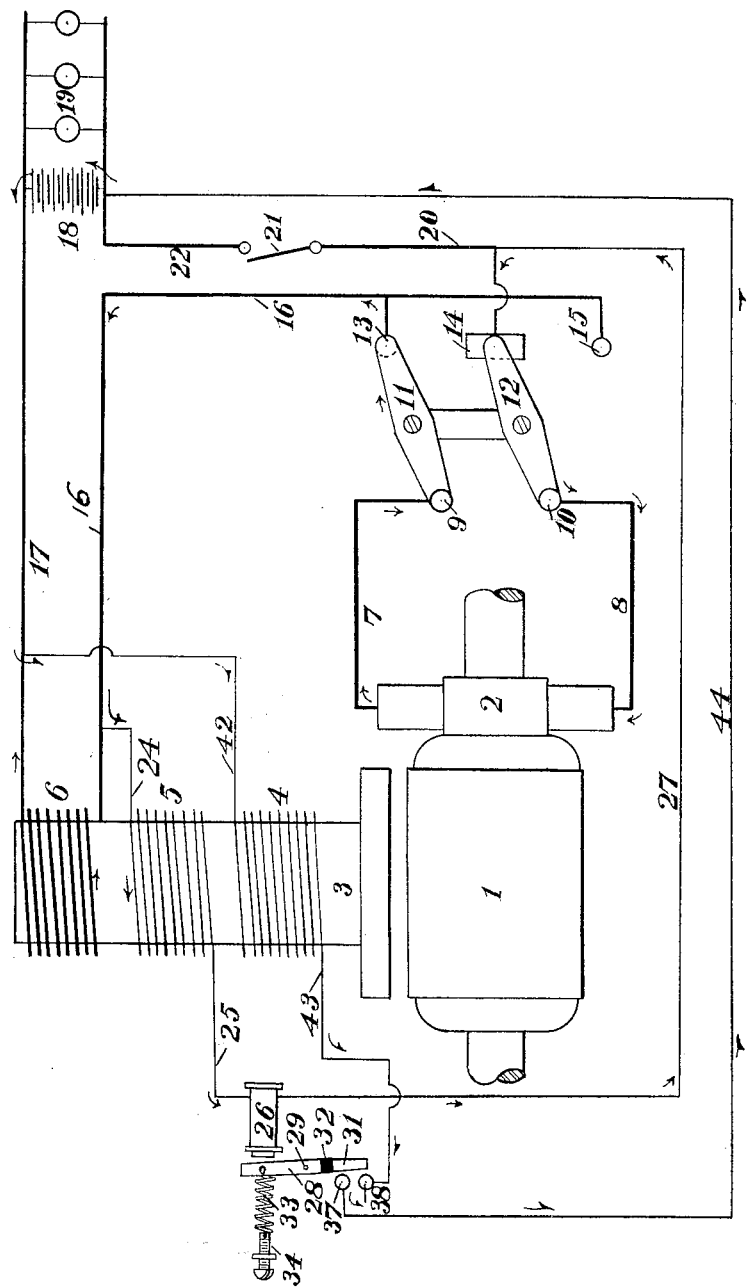
Fig. I.
Witnesses:
Elmer E Allbee
Chas. A. McCune
Inventor:
John L. Creveling.

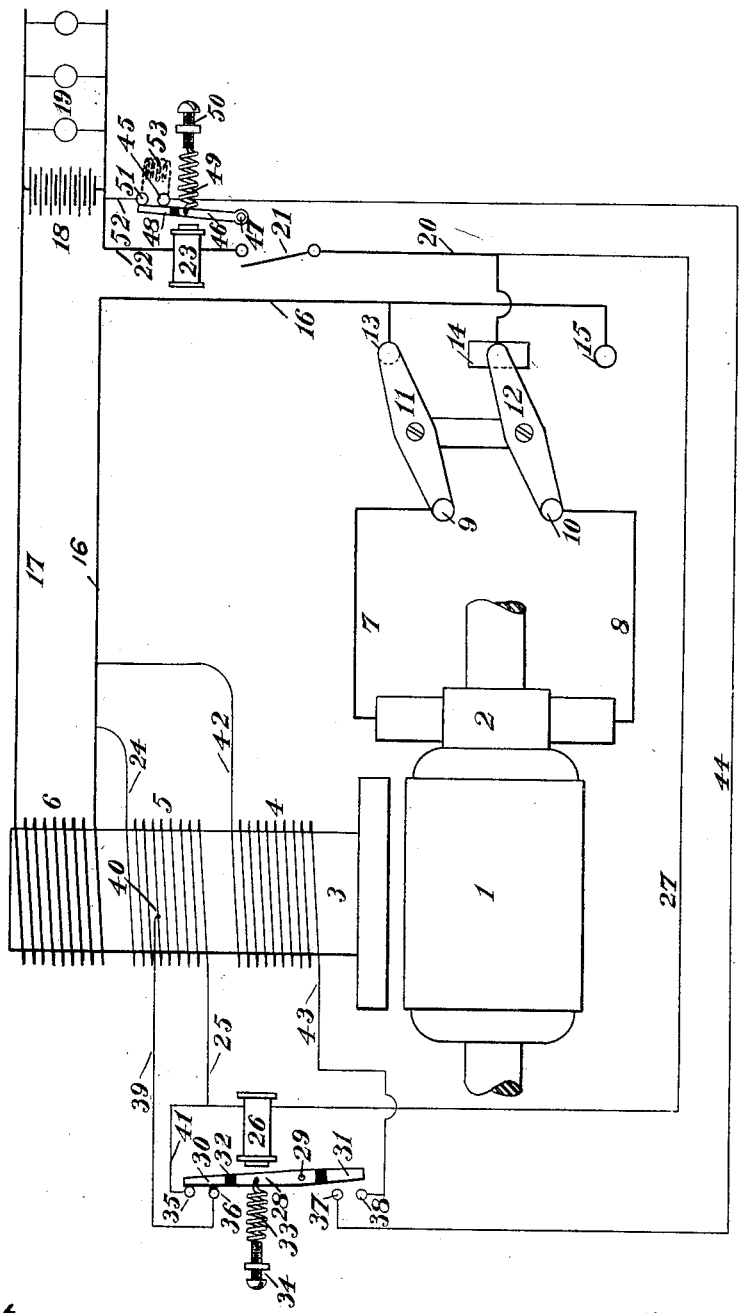
Fig. II.

UNITED STATES PATENT OFFICE.

JOHN L. CREVELING, OF NEW YORK, N. Y.

ELECTRIC-LIGHTING SYSTEM FOR CARS.

SPECIFICATION forming part of Letters Patent No. 634,286, dated October 3, 1899.

Application filed July 15, 1899. Serial No. 723,912. (No model.)

*To all whom it may concern:*

Be it known that I, JOHN L. CREVELING, a citizen of the United States, residing at New York, county of New York, State of New York, have invented new and useful Improvements in Electric-Lighting Systems for Cars, of which the following is a specification, reference being had to the accompanying drawings, forming a part thereof.

My invention pertains to a system of lighting cars by electricity generated by power taken from some rotating member the rotation of which is dependent upon the motion of the train—as, for example, the car-axle. Inasmuch as any such member is necessarily subject to varying speed of rotation, stoppage, and even reversal, it becomes necessary to provide means of maintaining practically-steady voltage regardless of the speed above a critical point and to provide means for maintaining the lights while the speed shall be below this point. In order to keep a practically-constant voltage upon the lamps and other devices, I have used a self-regulating dynamo of the differential compound type, having the series coils in opposition to the shunt or energizing coils, and to maintain the lights during stoppage or before the generator has reached the critical speed I have employed storage batteries or accumulators. It may readily be seen that in a system of this class, in which the speed is variable, intermittent, and reversible, it is advantageous to have the generator reach the voltage of the battery at as low speed as practicable. This I have accomplished by strongly energizing the dynamo-field by current taken from the storage battery, and my invention comprehends means whereby the connection between the field-energizing coils and the battery is made when the armature approaches a certain speed and broken when the speed of the armature falls below a certain degree, thus preventing waste of current by flowing through the energizing-coils while the generator is at rest.

In Figure I of the drawings, 1 represents the armature, 2 the commutator, and 3 the core, of the field-magnet of a dynamo or generator provided with the energizing-coils 4 and 5 and demagnetizing or regulating coil 6, the connections and functions of which will hereinafter be explained. The dynamo-leads 7 and 8 are connected to the posts 9 and 10 of any suitable style pole-changer adapted to reverse the connections between the generator and the line upon the reversal of direction of rotation of the armature. This switch I have merely indicated by the contact-levers 11 and 12, adapted to connect the terminals 9 with 13 and 10 with 14 or 9 with 14 and 10 with 15, according to the direction of rotation of the armature or direction of current supplied thereby, inasmuch as this switch forms no part of my present invention. A switch adapted to fill this office is shown in Patent No. 627,326, granted to me June 20, 1899.

The main 16 connects one side of the pole-changer (the positive side being taken for example) with the series coil 6, from which the main 17 runs to the positive terminal of the battery 18 and the lamps or other translating devices 19. The main 20 connects the other side of the pole-changer with the switch 21, from which the line 22 leads to the negative pole of the battery and the translating devices 19. The switch 21 may be of any of the well-known types adapted to close when the voltage of the generator equals or exceeds that of the battery and to open when the voltage of the generator falls below that of the battery, so as to prevent the battery discharging back through the generator tending to drive the same as a motor. This switch is merely indicated in the drawings, inasmuch as it forms no part of my present invention.

The wire 24 connects one end of the shunt or energizing coil 5 with the dynamo-main 16, while 25 connects the other end of the coil with the winding of the magnet 26, from which the wire 27 leads to the other dynamo-main 20. The magnet 26 is provided with the armature 28, pivotally supported as by the screw 29 and carrying the contact-piece 31 insulated therefrom as by the member 32. The spring 33, adjustable as by the screw 34, tends to hold the armature 28 away from the magnet 26. When excited, the magnet 26 tends to attract its armature 28 and to cause 31 to establish electrical connection between 37 and 38. The wire 42 connects one end of the exciting-coil 4 with the main 17, while the wire 43 connects the opposite end of the coil 4 with the switch-terminal 38, and the wire 44 leads from the switch-terminal 37 to the main 22.

In Fig. II all the parts shown in Fig. I are present and have been given like numbers, and I have shown the wire 42 as joined to the wire 16 instead of the wire 17, as shown in Fig. I, merely to indicate that it may lead from either side of the coil 6. In Fig. II, however, the following modifications are shown: The armature 28 has attached at its upper end the contact-piece 30, insulated therefrom as by the member 32 and so arranged as to cause electrical connection between the terminals 35 and 36 when the armature 28 is in the position shown in the drawings, in which position the spring 33 tends to hold it and to break the connection between 35 and 36 when the armature 28 is moved toward the magnet 26. The wire 39 taps the coil 5 at a suitable point, as indicated at 40, and leads to the terminal 36, and the wire 41 connects the terminal 35 with the wire 25. The magnet 23 is inserted in the main 22, and has an armature 46, pivotally supported, as by 47, and provided with the contact-piece 48, adapted to cause electrical connection between the terminals 45 and 51 when in the position shown in the drawings, in which position it is held by the influence of the spring 49, adjustable as by the screw 50, until the influence of the spring is overcome by the magnet 23. The wire 44 leads to the terminal 45, and the wire 52 connects the terminal 51 with the main 22. The resistance 53 may be connected across the terminals 45 and 51 for the purpose of adjustment, as will be explained.

The practical operation of my improved system, as shown in Fig. I, is substantially as follows: Starting with the armature at rest and the switches in the positions shown in the drawings, now if the train start to move the armature will revolve and the pole-changing switch will properly connect the dynamo-leads 7 and 8 with the mains 16 and 20, and in this case we will consider the armature revolving in such direction as to cause 7 to be the positive and 8 the negative lead. As soon as the armature reaches any appreciable speed the residual magnetism of the field-magnet core 3 will cause a current to be generated in the armature, which will flow from the lead 7 through the switch 9 11 13 to the main 16, to wire 24, through coil 5 and wire 25, through windings of magnet 26 to wire 27, to wire 20, switch 14 12 10, returning to the armature through the lead 8. This current will be very feeble at a very low speed; but if the magnet 26 be properly designed it may be caused by this current to attract its armature 28 when the armature of the dynamo is still revolving at a slow speed. When the speed is sufficient to cause the magnet 26 to attract this armature, electrical connection will be established between 37 and 38 and current will flow from the battery 18, through the main 17 to wire 42, coil 4, wire 43, switch 38 31 37, and returning to the battery through wire 44. This current will strongly energize coil 4, and this coil, together with coil 5, provides a strong and stable field, and the voltage of the generator will steadily increase with the speed until the voltage is reached at which the switch 21 is set to operate, and when this speed is reached the switch will close and allow current to flow from 16 through demagnetizing-coil 6, main 17 to the battery 18 and lamps or other translating devices 19, from which return is made through wire 22, switch 21, and wire 20. As speed increases the current flowing through the mains and battery will increase; but owing to the low resistance of the battery and the effect of the demagnetizing-coil 6, if properly proportioned, the voltage upon the mains will be practically constant within the limits of speed reached by the train. Should the speed fall until the voltage of the generator is low enough to cause the switch 21 to open, the battery alone will supply current to the lamps, and should it rise again 21 will close and the generator will again supply current to the battery and lamps. Now if the speed fall again the switch 21 will open at the proper voltage, and if it still continue to fall the current flowing through 26 will decrease until the magnet is unable to hold its armature against the influence of the spring 33, when the connection between 31 37 38 will be broken, and if the speed now remain below this point or if the car be stopped no current will be wasted by flowing from the battery through the shunt-coil 4.

Should the train start again in the same direction, the operation may be determined from the above. Should the train start in the opposite direction, the operation may be followed from the above description, providing the pole-changer respond properly and connect 7 with 14 and 8 with 15, as intended; but should the pole-changer fail to work and leave the connections as shown in the drawings it will be seen that no injury could be caused to the battery, since the current would flow through the coil 5 in the direction opposed to that intended, and when of proper strength to cause the magnet 26 to close the switch 31 37 38 the battery-current through the coil 4 would generate magnetic lines of force in an opposite direction to those generated by the coil 5, so that the voltage required to close the switch 21 could not be reached at any speed made by the train.

The practical operation of the system, as shown in Fig. II, is substantially as follows: Starting with the armature at rest and the switches in the position shown in the drawings, if the armature start to revolve the pole-changer will connect the leads 7 and 8 with the mains according to the direction of rotation, which we will take as being such as to cause 7 to be the positive and 8 the negative lead. As soon as the armature revolves at any appreciable speed the residual magnetism of the core 3 will cause a current to be generated in the armature, which will flow from the armature 1 through lead 7, switch 9 11 13 to main 16 to 24, through coil 5 to point 40, where it will divide and mostly flow through the wire 39 to switch 35 30 36 and wire 41 to the winding of coil 26, part also going through the remainder of coil 5 and wire 25 to the windings of the magnet 26, from which return to the generator is made through the wire 27, main 20, switch 14 12 10, and lead 8. Of course this current will have a very low voltage while the armature is revolving very slowly; but owing to the very low resistance of the few turns of the field-magnet and the external circuit the quantity of current that will flow through the magnet 26 will be considerable and will increase at an enormous rate even at low speed. Thus it is obvious that if the coil 5 be properly wound and tapped in the proper place and if the magnet 26 be properly proportioned this current may be made to operate the armature or switch lever 28 at a very low speed of revolution of the dynamo-armature. As soon as this necessary speed is reached the armature is suddenly drawn over to the pole-piece of the magnet 26, breaking the connection through 36 30 35 and establishing connection between the terminals 37 and 38. This allows current to flow from the battery 18, through main 16, to wire 42, thence through coil 4 to wire 43, through switch 38 31 37 to wire 44, to switch 45 48 51 to wire 52, and wire 22 to the opposite pole of the battery 18. This current strongly energizes the field-coil 4, and the current flowing through the shunt-magnet 5 and magnet 26 now is capable of holding the armature 28 even though the speed of the dynamo-armature still be very slow. Now if the speed increase the voltage of the dynamo will steadily increase and when the proper voltage is reached the switch 21 will close and current will flow through the main 16, series-demagnetizing coil 6, main 17 to battery 18 and lamps 19 to main 22 through windings of magnet 23, switch 21 to wire 20, and we will now have practically a differential compound dynamo with one series-demagnetizing coil and two shunt or energizing coils in multiple. With a differential compound dynamo of this type a wide variation of speed is possible with little variation of voltage above a critical point, but the current increases with the speed. Of course, a generator can be compounded so as to give the maximum current permissible at the maximum speed of the train, but with this arrangement very little current is generated at the lower speeds and at the normal speed of the train only about one-half of the maximum current is usually given. In order to generate considerable current at a low speed and as strong if not stronger at the normal than at the maximum speed, I have employed the switch operated by the magnet 23, the windings of which are in series with the armature-circuit. This switch is so constructed that when the current flowing through 23 reaches a predetermined strength the magnet will attract its armature 46 and break the connection between 45, 48, and 51, thus either cutting out the shunt-coil 4 or inserting the resistance 53, as indicated by the dotted line in the drawings, as may be desired. When this coil is cut out or the resistance 53 inserted, as the case may be, the current flowing from the generator is greatly lessened, but the windings of the coil 23, the spring 49, and the distance between the armature 46 and the magnet are so proportioned that the magnet 23 will still hold its armature with this reduced current on account of the reduction of the air-gap. If the speed now increase, the generator will merely supply a stronger current to the battery and lamps. Should the speed fall until the current flowing through 23 is unable to hold the armature 46 against the action of the spring 49, the armature will be pulled away from the magnet and cause the shunt-coil 4 to again exert its full strength upon the generator-field. This will cause the current from the generator to be greatly increased, and if the speed increase again the connections between 45, 48, and 51 will again be broken. However, should the speed fall until the voltage be reached at which the switch 21 is set to open, the main circuit will be broken and will remain so unless the speed again rise, when the above-outlined operation would be repeated. Should the speed fall still lower, the magnet 26 will weaken, but will not release the armature 28 until the train is nearly stationary, owing to the influence of the coil 4. Should the armature stop, the magnet 26 will release its armature, breaking the battery-circuit through the coil 4, avoiding all loss of current flowing through this coil while the car is standing, and making connection between 35, 30, and 36, thereby shunting a large portion of the energizing-coil 5 and establishing a circuit of very low resistance across the armature-mains. Should the train again start in either direction, the operation may be determined from the above.

I do not wish in any way to limit myself to the exact forms of apparatus shown in the drawings, which are merely examples of forms of apparatus embodying my invention and which might be subject to considerable alteration without departing from the spirit thereof.

Having thus described my invention, what I consider as novel, and desire to secure by Letters Patent, is set forth in the following claims:

1. A main circuit containing a dynamo, a storage battery and an electric make-and-break switch, said dynamo having a field-energizing coil or coils in a derived circuit across the mains between the generator and said switch, and a field-energizing coil or coils in a derived circuit from the battery, in combination with an electromagnetic switch adapted to close said derived circuit when excited by current generated in the dynamo-armature and to open said circuit when said current ceases to flow, substantially as described.

2. A circuit containing a generator, a storage battery and an electric switch adapted to close said circuit when the electromotive force of the generator reaches a predetermined degree and to open said circuit when the electromotive force of the generator falls to a predetermined degree and a pole-changing switch adapted to reverse the dynamo-terminals upon reversal of direction of rotation of the armature, said dynamo having a field-exciting coil or coils in a derived circuit from the battery and a field-exciting coil or coils in a derived circuit across the mains between the pole-changer and the main switch, substantially as described.

3. A generator having a field-energizing coil or coils in shunt across the generator-mains, and a field-energizing coil or coils in a circuit containing a storage battery and an electromagnetic switch, said electromagnetic switch having an operating coil or coils deriving current from the armature of the generator whereby said switch is caused to close the circuit containing the energizing-coil and the storage battery when current from the generator shall have reached a certain voltage, and to open said circuit when the voltage of this current shall have fallen to a certain degree, substantially as described.

4. A main circuit containing a generator, a storage battery and a main make-and-break switch, said generator having a field-energizing coil or coils in shunt across the mains between the generator and the main switch, and a field coil or coils in a derived circuit from the storage battery, said derived circuit containing an electromagnetic switch having an actuating coil or coils deriving current from the dynamo-armature, in combination with a circuit of low resistance containing an actuating coil or coils of said switch and a switch operated thereby, controlling said low resistance circuit, substantially as described.

5. A combination of a circuit containing a dynamo, a storage battery, a make-and-break switch and an electromagnet, said dynamo having an energizing coil or coils in shunt across the mains between the generator and said switch, and a field-energizing coil or coils in a derived circuit from the battery, of a switch in said derived circuit operated by the electromagnet in the main circuit, substantially as described.

In testimony of all of which I have hereunto subscribed my name.

JOHN L. CREVELING.

Witnesses:
H. G. DARWIN,
ELMER E. ALLBEE.